(12) United States Patent
Rombakh et al.

(10) Patent No.: US 10,834,164 B2
(45) Date of Patent: Nov. 10, 2020

(54) VIRTUALIZING AUDIO AND VIDEO DEVICES USING SYNCHRONOUS A/V STREAMING

(71) Applicant: Wyse Technology L.L.C., Santa Clara, CA (US)

(72) Inventors: Oleg Rombakh, Los Gatos, CA (US); Richard Goldberg, Los Gatos, CA (US)

(73) Assignee: Wyse Technology L.L.C., Santa Clara, UT (US)

( * ) Notice: Subject to any disclaimer, the term of this patent is extended or adjusted under 35 U.S.C. 154(b) by 364 days.

(21) Appl. No.: 15/427,281

(22) Filed: Feb. 8, 2017

(65) Prior Publication Data

US 2018/0227347 A1 Aug. 9, 2018

(51) Int. Cl.
*H04N 21/233* (2011.01)
*H04N 21/234* (2011.01)
*H04L 29/06* (2006.01)
*G06F 9/451* (2018.01)
(Continued)

(52) U.S. Cl.
CPC ............ *H04L 65/607* (2013.01); *G06F 9/452* (2018.02); *H04L 65/4069* (2013.01); *H04L 65/605* (2013.01); *H04N 21/233* (2013.01); *H04N 21/234* (2013.01); *H04N 21/4227* (2013.01); *H04N 21/42692* (2013.01)

(58) Field of Classification Search
None
See application file for complete search history.

(56) References Cited

U.S. PATENT DOCUMENTS

2010/0091113 A1* 4/2010 Morioka ................ H04N 5/147
348/207.1
2011/0280316 A1* 11/2011 Chen .................... H04N 13/161
375/240.25
(Continued)

OTHER PUBLICATIONS

"Preparing Audio now happens before each encoding file . . . causing seriously slow encodes as a result!", Adobe Forums website, Jan. 26, 2015 [retrieved on Sep. 9, 2018]. Retrieved from the Internet: <URL: https://forums.adobe.com/thread/1547792>. (Year: 2015).*

(Continued)

*Primary Examiner* — Sm A Rahman
*Assistant Examiner* — Dae Kim
(74) *Attorney, Agent, or Firm* — Kirton McConkie; Brian Tucker

(57) ABSTRACT

Audio and video devices can be virtualized using synchronous A/V streaming. When a video device such as a webcam is connected to a client terminal while the client terminal has established a remote session on a server, video data generated by the video device can be encoded into an encoded video stream using the H.264 or similar standard. Additionally, audio data corresponding to the video data can be embedded into the encoded video stream. The encoded video stream with the embedded audio can then be transferred to the server. The server-side components can extract the audio from the stream and perform the necessary decoding on the video and possibly on the audio data prior to providing the decoded data to drivers that function as virtualized audio and video devices on the server.

20 Claims, 6 Drawing Sheets

(51) Int. Cl.
*H04N 21/426* (2011.01)
*H04N 21/4227* (2011.01)

(56) References Cited

U.S. PATENT DOCUMENTS

| | | | |
|---|---|---|---|
| 2013/0254263 A1* | 9/2013 | Kwon | H04L 29/02 709/203 |
| 2014/0068007 A1* | 3/2014 | O'Gorman | H04N 7/147 709/219 |
| 2015/0237356 A1* | 8/2015 | Wu | H04N 19/70 375/240.03 |
| 2016/0100196 A1* | 4/2016 | Wu | H04N 19/70 375/240.02 |
| 2016/0173812 A1* | 6/2016 | Suh | H04N 21/6125 725/32 |
| 2017/0063960 A1* | 3/2017 | Stockhammer | H04L 65/607 |
| 2018/0129510 A1* | 5/2018 | Zhang | H04L 67/38 |

OTHER PUBLICATIONS

Li et al. "Audio-Video synchronization coding approach based on H.264/AVC", IEICE Electronics Express, vol. 6, No. 22, 1556-61, Nov. 25, 2009 [retrieved on Mar. 26, 2019]. Retrieved from the Internet: <URL: https://www.jstage.jst.go.jp/article/elex/6/22/6_22_1556/_pdf>. (Year: 2009).*

* cited by examiner

VIRTUALIZING AUDIO AND VIDEO DEVICES USING SYNCHRONOUS A/V STREAMING

CROSS-REFERENCE TO RELATED APPLICATIONS

N/A

BACKGROUND

The present invention is generally directed to device virtualization in a virtual desktop infrastructure (VDI) environment. Device virtualization generally refers to making a device that is connected to a client terminal accessible within a virtual desktop on a server as if the device had been physically connected to the server. In other words, when a device is virtualized, a user can connect a device to his or her client terminal and the device will function as if it had been connected to the server.

Although video devices such as webcams could be virtualized using USB redirection techniques, various difficulties exist. The following description of USB redirection is intended to provide an overview of various virtualization techniques and to exemplify the difficulties that arise when a video device is redirected as a USB device.

In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client side, the desktop running on server 104 may represent a virtual desktop environment.

FIG. 2 is a block diagram of a local device virtualization system 200 that is configured to implement USB device redirection. System 200 may include client 102 in communication with server 104 over network 106 as illustrated in FIG. 1. Client 102 may include a proxy 210, a stub driver 220, and a USB bus driver 230. Client 102 can be connected to a USB device 240, as shown in FIG. 2. Server 104 may include an agent 250 and a virtual USB bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a user session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a user session through which client 102 is connected to server 104, such as a session number or a session locally unique identifier (LUID). Agent 250 can provide notification of device 240, along with the device information, to virtual bus driver 260. Virtual bus driver 260 (which may be a TCX USB bus driver, or any other bus driver) may be configured to create and store in memory a record corresponding to device 240, the record including at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281*a*, 281*b*, . . . , 281*n*, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282*a*, 282*b*, . . . 282*n*, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281*a* stating that a new device has been plugged in. Next, a plug-and-play (PNP) component of the operating system will search for and load the best driver for device 240, which will create another device object 281*b* that is layered over the previous device object 281*a*. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a user session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

As mentioned above, it is possible to use these USB redirection techniques to virtualize a webcam on a server. However, redirecting a webcam at the USB level presents a number of problems. For example, USB redirection would require packaging the video data produced by the webcam in USB Request Blocks (or URBs) and then transmitting these URBs over the network to server 104. In particular, if USB device 240 is a webcam, USB bus driver 230 and stub driver 220 would cause URBs containing the video data to be provided to proxy 210 for delivery over the network to agent 250. Agent 250 would then route the URBs to virtual USB bus driver 260 for processing by device stack 280 (e.g., in the form of IRPs). The fragmenting of the video data into URBs would result in a large number of relatively small network communications and would therefore substantially offset the benefit of any bulk compression that may be applied to the video data. A substantial amount of processing would also be required on the server side to process the large number of URBs.

If there is audio data associated with the video data, further difficulties exist. For example, the audio data may be transferred/processed over different channels than the video data thereby making it difficult to synchronize the audio and video data. For example, audio data may be delayed relative to video data when transferred over different virtual channels such that the A/V data will be out-of-sync on server 104. In short, when a user employs a webcam (or other type of video capture device) in a VDI environment, the experience will typically be suboptimal.

BRIEF SUMMARY

The present invention extends to methods, systems, and computer program products for virtualizing audio and video devices using synchronous A/V streaming. When a video device such as a webcam is connected to a client terminal while the client terminal has established a remote session on a server, video data generated by the video device can be encoded into an encoded video stream using the H.264 or similar standard. Additionally, audio data corresponding to the video data can be embedded into the encoded video stream. The encoded video stream with the embedded audio can then be transferred to the server.

A server-side component can be configured to receive the encoded video stream and extract the audio data from the stream. The video data can then be decoded and provided to a video device stack that has been loaded on the server to thereby create a virtualized video device. Similarly, the audio data can be provided to an audio device stack that has been loaded on the server to thereby create a virtualized audio device. As a result, applications on the server will view the video and audio devices as if they were connected to the server rather than to the client terminal. Also, because the audio data is embedded into the encoded video stream with the corresponding video data, the audio and video data will be synchronized on the server.

In one embodiment, the present invention is implemented as a method for virtualizing audio and video devices on a server. A VDI client that executes on a client terminal to which a video device and an audio device are connected can receive video data and audio data. The VDI client can encode the video data to create an encoded video stream and embed the audio data within the encoded video stream. The VDI client can then transfer the encoded video stream with the embedded audio data to the server.

In another embodiment, the present invention is implemented as computer storage media storing computer executable instructions which when executed implement a VDI architecture that includes a VDI client that is configured to execute on a client terminal to encode video data into an encoded video stream and to embed audio data in the encoded video stream, and a virtual channel endpoint that is configured to execute on a server to receive the encoded video stream with the embedded audio data from the VDI client, extract the audio data from the encoded video stream, decode the encoded video stream into decoded video data, and output the extracted audio data and the decoded video data.

In another embodiment, the present invention is implemented as a method for virtualizing audio and video devices on a server. A sequence of images can be received from a video device while a sequence of audio samples can be received from an audio device. The sequence of images can be encoded by generating an access unit for each image, each access unit comprising a number of NAL units. For each access unit, one or more of the audio samples can be embedded in one or more NAL units, the one or more audio samples corresponding to the image for which the access unit was generated.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, an encoded video stream should be construed as video data that has been encoded in accordance with the H.264 standard, the H.265 standard, or any subsequent compression standard that employs similar techniques for organizing encoded video data into network abstraction layer (NAL) units. A video device should be construed as any device that can be coupled to or incorporated into a client terminal and that outputs a sequence of captured images. The captured images may be in any suitable format such as YUV or RGB. An audio device should be construed as any device that can be coupled to or incorporated into a client terminal and that outputs a sequence of audio samples. Common examples of video and audio devices include a webcam and a microphone.

Figure 1:
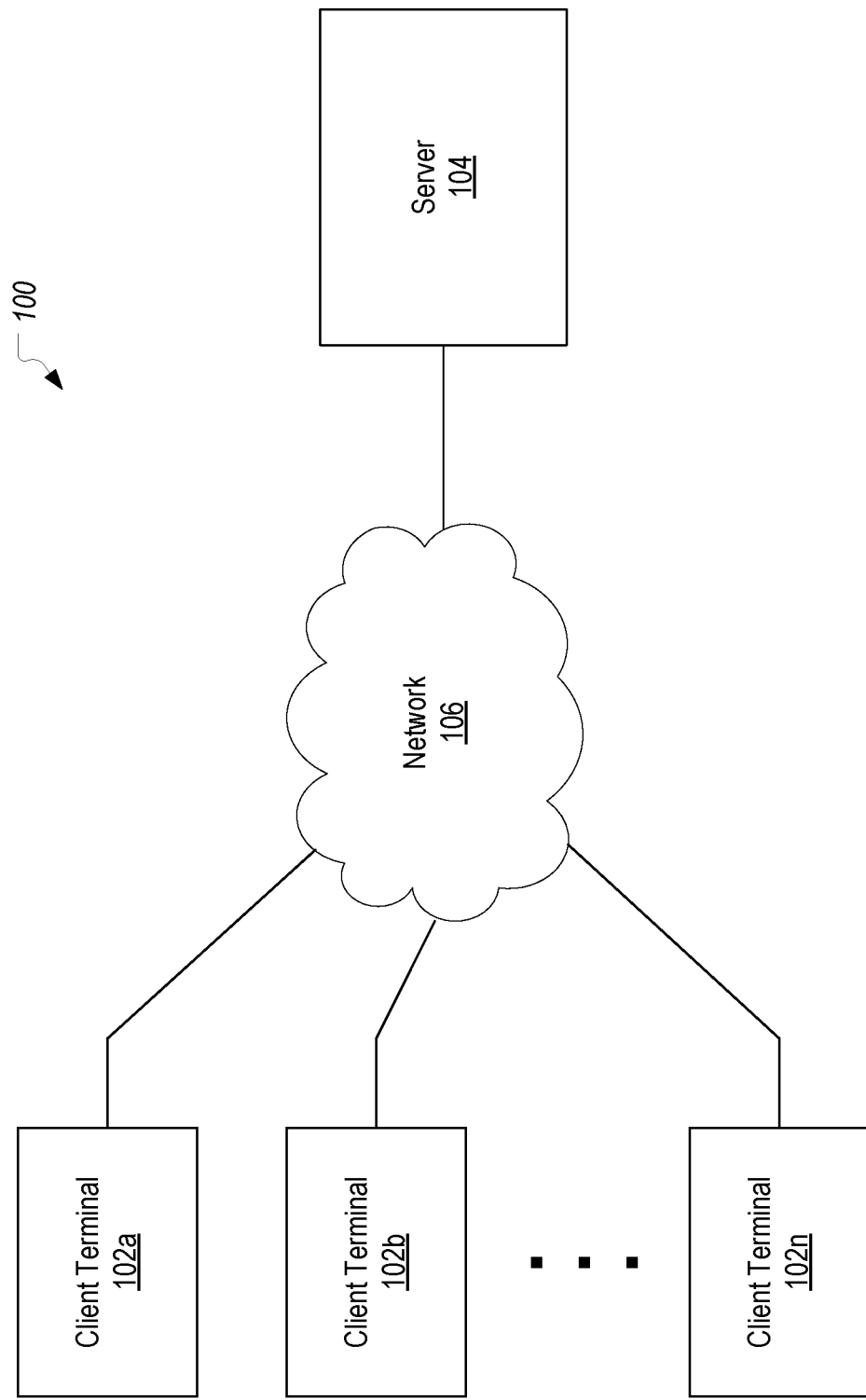
FIG. 1 illustrates an example computing environment in which the present invention can be implemented.
Figure 2:
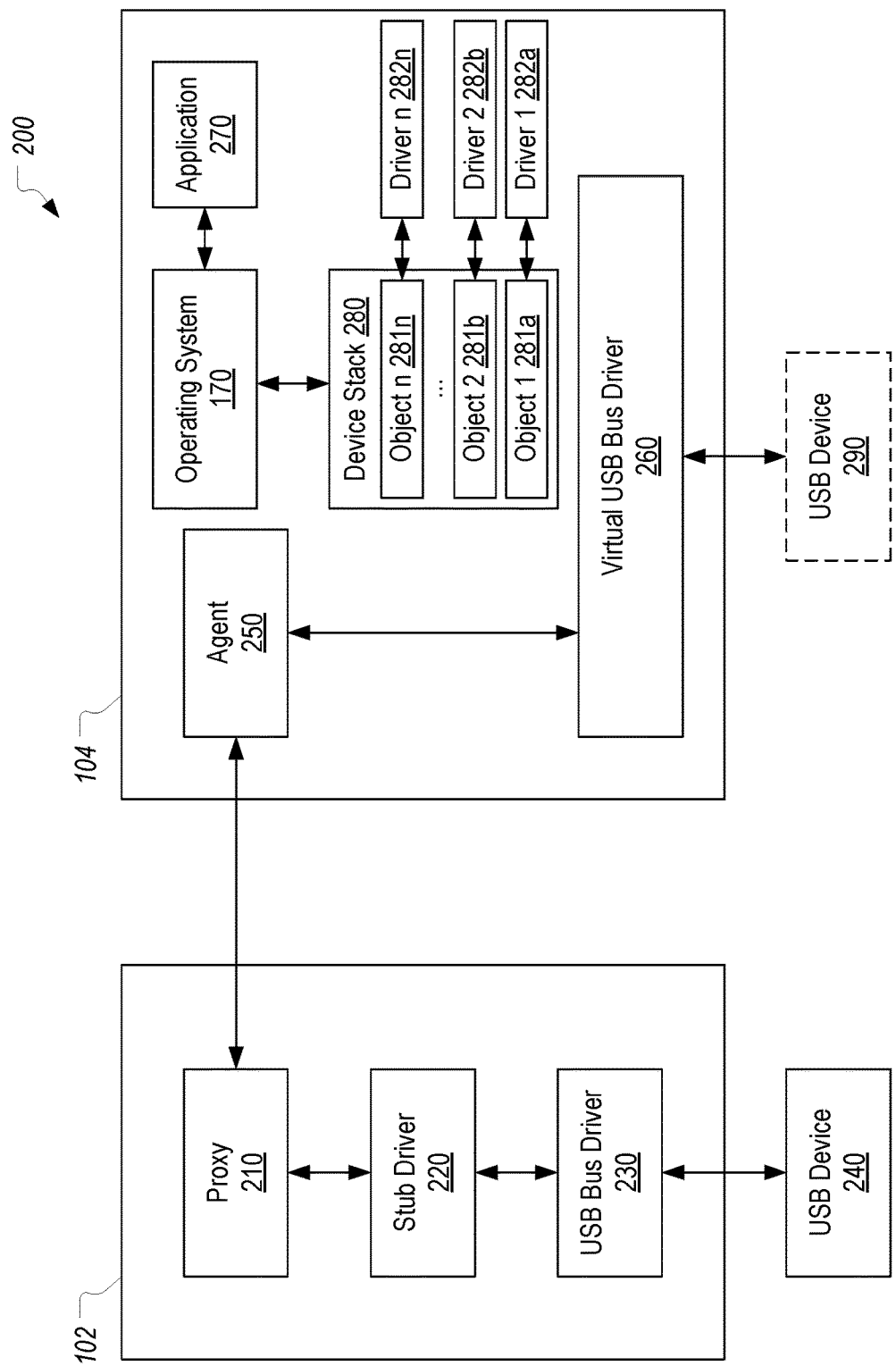
FIG. 2 illustrates a prior art USB device redirection architecture.
Figure 3:
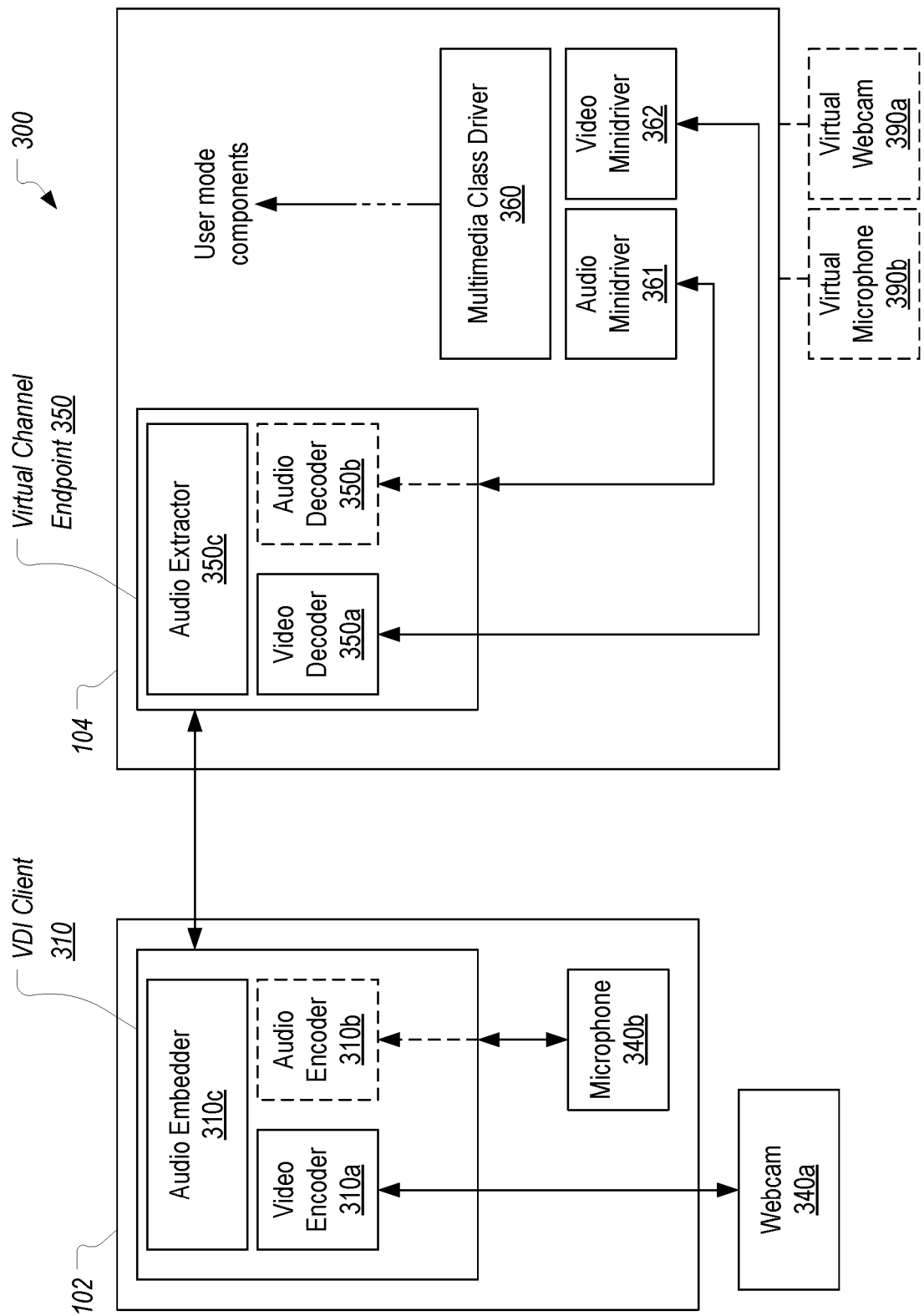
FIG. 3 illustrates an example VDI architecture that can be employed to virtualize audio and video devices on a server.

Turning now to FIG. 3, a VDI architecture 300 in which the present invention can be implemented is shown. VDI architecture 300 includes a server 104 and at least one client terminal 102 that is capable of establishing a remote session on server 104 using any suitable remote display protocol. Prior to describing the components of VDI architecture 300, it is noted that the present invention does not employ USB redirection techniques to virtualize video and audio devices on server 140. However, these video and audio devices may still be USB devices and therefore client terminal 102 may include appropriate USB drivers to allow the client-side components of VDI architecture 300 to communicate with the audio and video devices. Alternatively, the audio and video devices may couple to client terminal 102 via a non-USB interface. Therefore, the manner in which an audio or video device is coupled to or incorporated into client terminal 102 is not essential to the invention.

In FIG. 3, client terminal 102 is shown as including a VDI client 310 which can be configured to implement a remote display protocol for the purpose of establishing a remote session on server 104 as well as virtual channels for communicating audio and video data to a virtual channel endpoint 350 on server 104. For example, VDI client 310 can be configured to initiate the creation of a dynamic virtual channel when webcam 340*a* is connected to client terminal 102 (or at least when webcam 340*a* is used to capture video).

VDI client 310 can be configured to receive video data from webcam 340*a* and audio data from microphone 340*b*. As mentioned above, the video data may typically be in YUV format, but could be in any other suitable format. VDI client 310 can include a video encoder 310*a* that is configured to implement the H.264 (or similar) standard to thereby convert received video data into an encoded video stream. Also, in some embodiments, VDI client 310 can include an audio encoder 310*b* that encodes audio data into a desired format. It is not necessary to encode the audio data to implement the present invention, and therefore, audio encoder 310*b* is drawn in dashed lines to indicate that it is optional.

VDI client 310 is further shown as including an audio embedder 310*c* which is configured to embed audio data into the encoded video stream that is produced by video encoder 310*a*. The output of audio embedder 310*c* will therefore be an encoded video stream representing a sequence of captured images with the audio data corresponding to each captured image embedded therein. The depiction of video encoder 310*a*, audio encoder 310*b*, and audio embedder 310*c* as separate components is for illustrative purposes only and any suitable configuration of components that perform the functionality can be employed.

VDI client 310 can then transfer the encoded video stream with the embedded audio to virtual channel endpoint 350. Virtual channel endpoint 350 can include an audio extractor 350*c* that is configured to extract the audio data that has been embedded into the encoded video stream. If the audio data has been encoded, audio extractor 350*c* can route the encoded audio data to audio decoder 350*b*. The encoded video stream can also be provided to video decoder 350*a* which can implement the H.264 (or similar) standard to decode the video data. Therefore, the output of virtual channel endpoint 350 can be decoded video data representing a sequence of captured images as well as corresponding audio samples.

When webcam 340*a* and microphone 340*b* are connected to client terminal 102, VDI client 310 can send appropriate notifications to the server-side VDI components (not shown) to cause audio minidriver 361 and video minidriver 362 to be loaded on server 104. In some embodiments, audio minidriver 361 and video minidriver 362 can be configured to interact with a multimedia class driver 360 (e.g., the Windows-provided AVStream class driver). The loading of audio minidriver 361 and video minidriver 362 will cause virtual webcam 390*a* and virtual microphone 390*b* to appear on server 104. In other words, from the perspective of an application executing within the user's remote session on server 104, webcam 340*a* and microphone 340*b* will appear as if they were physically connected to server 104. Video minidriver 362 can be configured to receive decoded video data (e.g., video data in YUV or RGB format) from virtual channel endpoint 350 as if virtual channel endpoint 350 were an actual webcam. Similarly, audio minidriver 361 can be configured to receive audio data from virtual channel endpoint 350 as if virtual channel endpoint 350 were an actual microphone. This audio and video data can then be passed up to multimedia class driver 360 to allow user mode components to consume the data in a typical manner.

Because the audio data is embedded in the encoded video stream, the audio and video data will be transferred in sync and processed through a common channel (i.e., through virtual channel endpoint 350). As a result, the audio and video data will be provided to audio and video minidrivers 361/362 in sync just as audio and video data would be provided if webcam 340*a* and microphone 340*b* were locally connected to server 104.

Figure 4A:
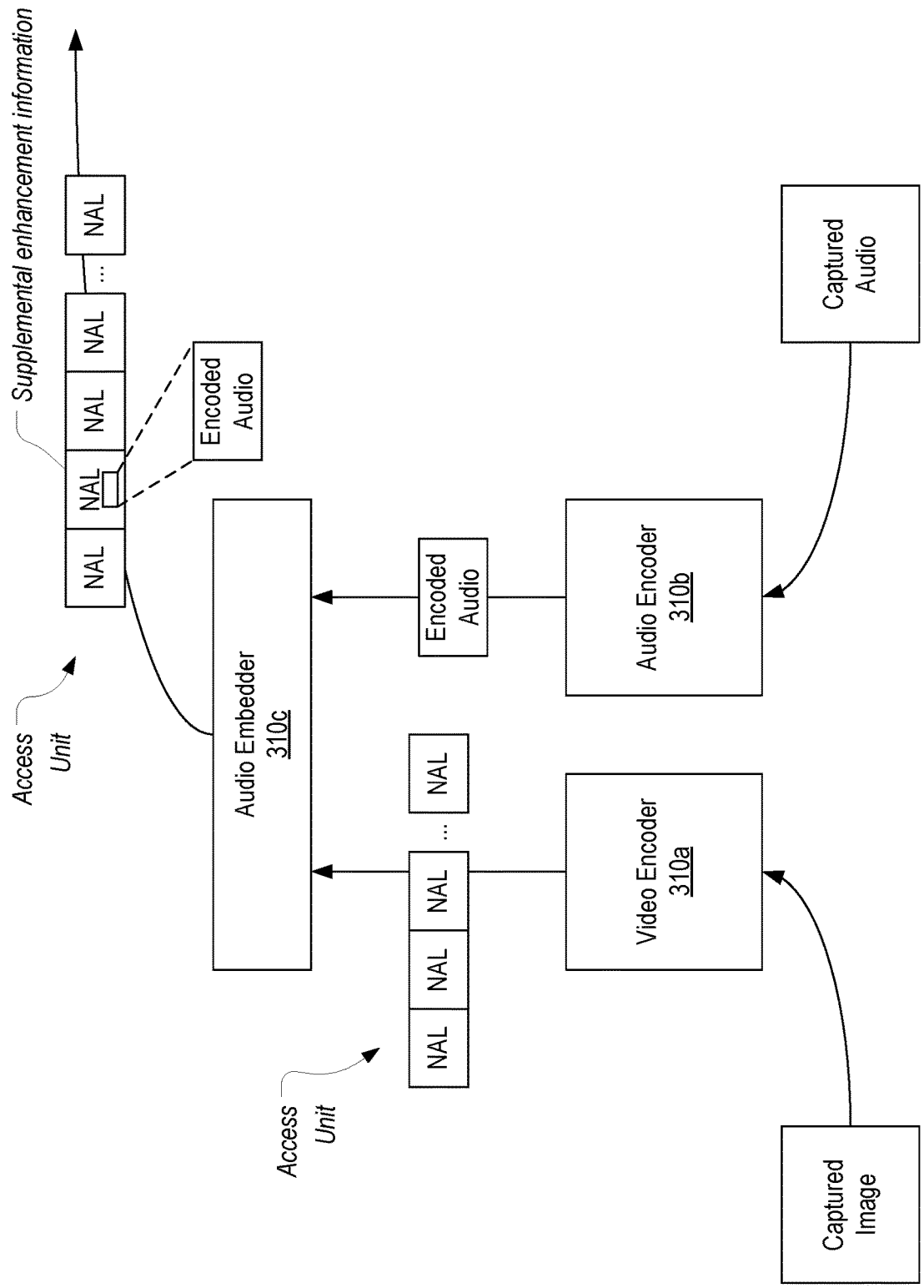
FIGS. 4A and 4B illustrate an example of how audio data can be embedded into an encoded video stream.
Figure 4B:
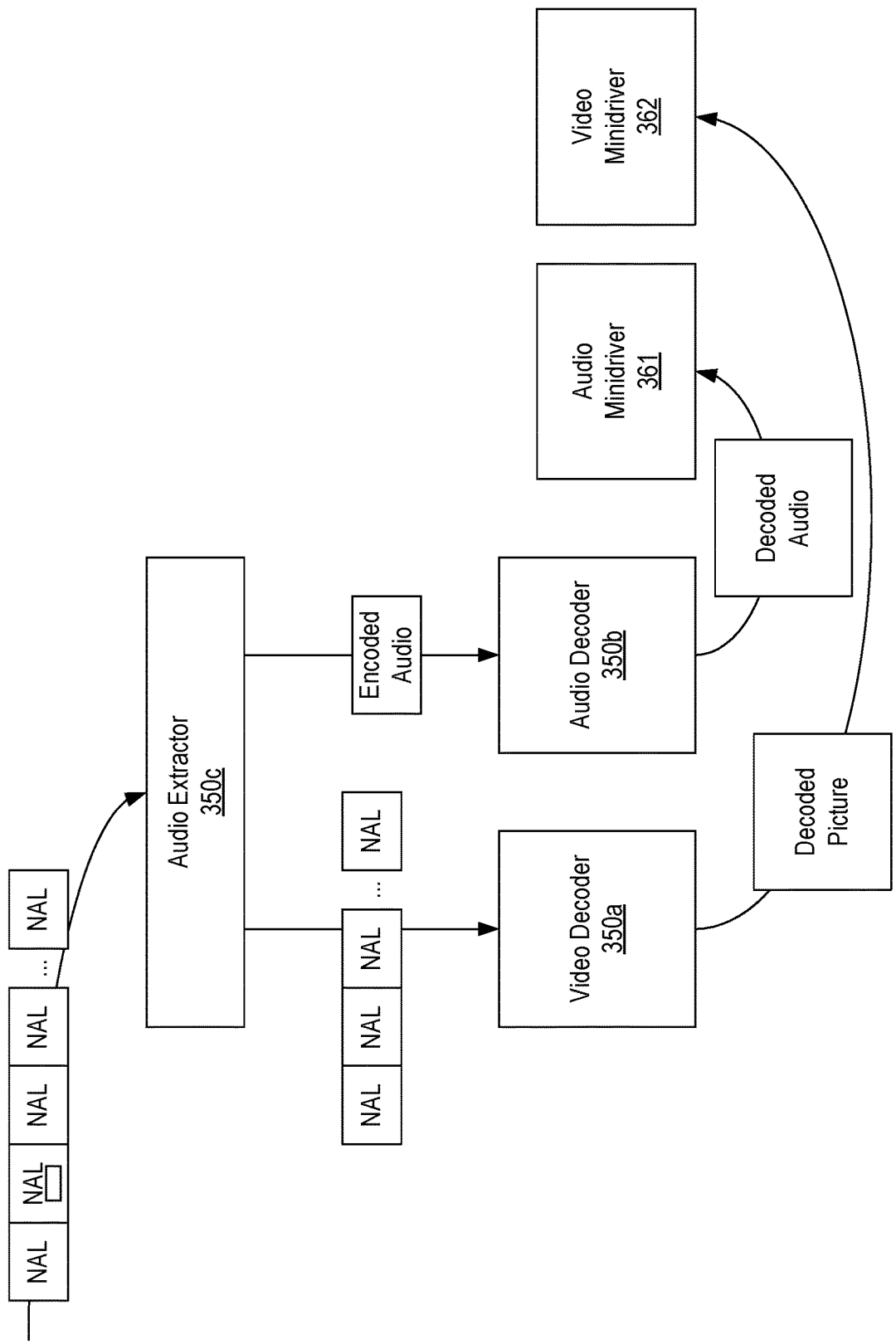

FIGS. 4A and 4B provide a more detailed example of how audio data can be embedded in an encoded video stream. FIG. 4A represents the processing that can be performed by VDI client 310 on client terminal 102 and is intended to represent this processing for a single captured image (or frame). It is noted, however, that this process would be repeatedly performed as webcam 340*a* outputs new images. Also, for purposes of this example, it will be assumed that VDI client 310 includes audio encoder 310*b*.

In accordance with the H.264 standard, when video encoder 310*a* receives a captured image, it can convert the image data into a set of NAL units called an "access unit." An access unit, once decoded, will produce a single image or frame. Although the details of the H.264 standard are beyond the scope of the present invention, it should be understood that the contents of the NAL units in an access unit may be dependent on the contents of other access units.

In any case, video encoder 310*a* will output an access unit that includes encoded video data that can be decoded (possibly with reference to video or other data contained in other access units) to recreate the captured image on server 104. In conjunction with this encoding of the video data, audio encoder 310*b* can output one or more encoded audio samples (or simply "encoded audio") that corresponds in time with the captured image. Audio embedder 310*c* can then embed the encoded audio in the access unit. More particularly, the H.264 standard provides a "Supplemental Enhancement Information" (or SEI) NAL unit type. SEI NAL units can be employed to transfer information that is not necessary but helpful in the video decoding or display process. Audio embedder 310*c* can store the encoded audio in an SEI NAL unit (or possibly multiple SEI NAL units) of the access unit that was created from the captured image. Therefore, the video data and its corresponding audio data will be contained within the same access unit.

FIG. 4A depicts that audio embedder 310*c* adds an NAL unit of type SEI to the access unit; however, this is for illustrative purposes only. Video encoder 310*a* could equally create the NAL unit(s) as part of the video encoding process and then audio embedder 310*c* could store the audio sample in the NAL unit(s). In any case, once the audio sample has been stored in an SEI NAL unit of the appropriate access unit (i.e., the access unit containing the video data defining the corresponding image), VDI client 310 may send the access unit to virtual channel endpoint 350. It is again noted that because VDI client 310 will be continuously embedding audio samples in access units, a number of access units can be buffered and then sent together to minimize overhead.

FIG. 4B represents how a received access unit can be processed by virtual channel endpoint 350. The access unit can be directed to audio extractor 350*c* which can be configured to identify SEI NAL units and to extract the audio data from such units. Since the audio data is encoded, audio extractor 350*c* can deliver the encoded audio to audio decoder 350*b*. On the other hand, the access unit can be directed to video decoder 350*a* for decoding. Although FIG. 4B represents that the SEI NAL unit is removed from the access unit, this need not be the case. It is equally possible that the access unit will still contain the SEI NAL unit with the audio data when it is passed to video decoder 350*a*. In such a case, video decoder 350*a* could ignore the contents of the SEI NAL unit. Again, the representation of video decoder 350*a*, audio decoder 350*b*, and audio extractor 350*c* as separate components is for illustrative purposes only.

Due to the processing performed by virtual channel endpoint 350, a decoded image and one or more corresponding decoded audio samples can be provided to video minidriver 362 and audio minidriver 361 respectively. Typically, this would be accomplished by storing a number of decoded images and corresponding audio samples in buffers that would be periodically passed to the minidrivers. In any case, due to the fact that the audio samples are embedded in the access units for the corresponding images, the audio and video data will be provided to the minidrivers in sync. The audio and video data can then be consumed in any desired manner as if the data had originated from physical devices connected to server 104.

In summary, the present invention can exploit the H.264 (or similar) standard to embed audio data in the encoded video stream thereby allowing audio and video data to be transferred and processed in sync in a VDI environment. As a result, the user experience will be greatly improved.

Figure 5:
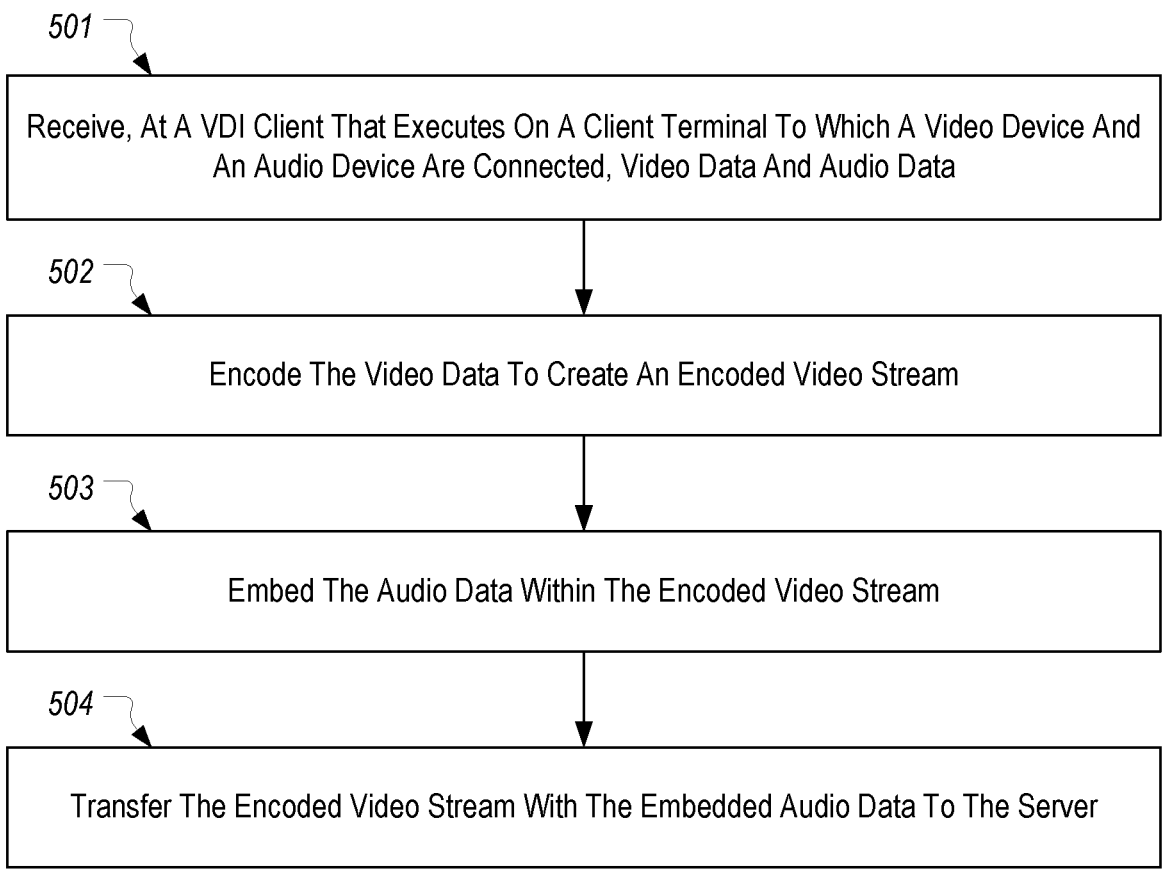
FIG. 5 illustrates a flowchart of an example method for virtualizing audio and video devices on a server.

FIG. 5 provides a flowchart of an example method 500 for virtualizing audio and video devices on a server. Method 500 can be implemented by VDI client 310 on a client terminal 102.

Method 500 includes an act 501 of receiving, at a VDI client that executes on a client terminal to which a video device and an audio device are connected, video data and audio data. For example, VDI client 310 can receive video data from webcam 340*a* and audio data from microphone 340*b*.

Method 500 includes an act 502 of encoding the video data to create an encoded video stream. For example, VDI client 310 can implement the H.264 or similar standard to generate an encoded video stream.

Method 500 includes an act 503 of embedding the audio data within the encoded video stream. For example, VDI client 310 can embed portions of audio data in the encoded video stream so that the portions of audio data are associated with a corresponding image defined in the encoded video stream.

Method 500 includes an act 504 of transferring the encoded video stream with the embedded audio data to the server. For example, VDI client 310 can transfer the encoded video stream via a dynamic virtual channel to virtual channel endpoint 350.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for virtualizing audio and video devices on a server comprising:
   receiving, at a VDI client that executes on a client terminal to which a video device and an audio device are connected, video data and audio data, wherein the video data comprises a sequence of images and the audio data comprises audible content;
   encoding the video data to create an encoded video stream, the encoding including creating an access unit for each image of the sequence of images, each access unit comprising a number of network abstraction layer (NAL) units;
   embedding the audio data within the encoded video stream, the embedding including, for each of at least some of the images in the sequence of images, adding a portion of the audio data that comprises audible content that corresponds with the particular image to one or more Supplemental Enhancement Information (SEI) NAL units of the access unit that was created for the particular image; and transferring the encoded video stream with the embedded audio data to the server.

2. The method of claim 1, wherein encoding the video data to create an encoded video stream comprises encoding the video data in accordance with the H.264 standard or the H.265 standard.

3. The method of claim 1, wherein the embedding includes, for each of the images in the sequence of images, adding a portion of the audio data that comprises audible content that corresponds with the particular image to the access unit that was created for the particular image.

4. The method of claim 1, wherein, for each of at least some of the images in the sequence of images, the portion of the audio data that comprises audible content that corresponds with the particular image is added to one SEI NAL unit of the access unit that was created for the particular image.

5. The method of claim 1, wherein, for each of at least some of the images in the sequence of images, the portion of the audio data that comprises audible content that corresponds with the particular image is added to multiple SEI NAL units of the access unit that was created for the particular image.

6. The method of claim 1, wherein the portion of the audio data that comprises audible content that corresponds with the particular image comprises the portion of the audio data that comprises audible content that is intended to be output when the particular image is intended to be displayed.

7. The method of claim 1, wherein the audio data is encoded prior to being embedded in the encoded video stream.

8. The method of claim 1, further comprising:
receiving, at a virtual channel endpoint on the server, the encoded video stream with the embedded audio data;
extracting the audio data from the encoded video stream, the extracting including, for each access unit having one or more SEI NAL units that include audio data, extracting the audio data from the one or more SEI NAL units;
decoding the encoded video stream into decoded video data; and
outputting the audio data and the decoded video data.

9. The method of claim 8, wherein outputting the audio data and the decoded video data comprises providing the audio data to an audio minidriver that represents a virtualized audio device on the server and providing the decoded video data to a video minidriver that represents a virtualized video device on the server.

10. The method of claim 8, wherein the embedded audio data is encoded, the method further comprising:
decoding the encoded audio data.

11. The method of claim 1, wherein the encoded video stream with the embedded audio data is transferred to the server via a dynamic virtual channel.

12. The method of claim 1, wherein the video device is a webcam and the audio device is a microphone.

13. One or more computer storage media storing computer executable instructions which when executed implement a VDI architecture comprising:
a VDI client that is configured to execute on a client terminal to encode video data comprised of a sequence of images into an encoded video stream and to embed audio data comprised of audible content in the encoded video stream, wherein the VDI client encodes the video data into the encoded video stream by creating an access unit for each image of the sequence of images, each access unit comprising a number of network abstraction layer (NAL) units, and wherein the VDI client embeds the audio data in the encoded video stream by adding, for each of at least some of the images in the sequence of images, a portion of the audio data that comprises audible content that corresponds with the particular image to one or more Supplemental Enhancement Information (SEI) NAL units of the access unit that was created for the particular image; and
a virtual channel endpoint that is configured to execute on a server to:
receive the encoded video stream with the embedded audio data from the VDI client;
for each access unit having one or more SEI NAL units that include audio data, extract the audio data from the one or more SEI NAL units;
decode the encoded video stream into decoded video data; and
output the extracted audio data and the decoded video data.

14. The computer storage media of claim 13, wherein the VDI client embeds the audio data in the encoded video stream by adding, for each of the images in the sequence of images, a portion of the audio data that comprises audible content that corresponds with the particular image to the access unit that was created for the particular image.

15. The computer storage media of claim 13, wherein each portion of the audio data that comprises audible content comprises one or more encoded audio samples that correspond in time to the particular image.

16. The computer storage media of claim 13, wherein encoding the video data comprised of the sequence of images into the encoded video stream comprises encoding the video data in accordance with the H.264 standard or the H.265 standard.

17. The computer storage media of claim 15, wherein the virtual channel endpoint is further configured to decode the encoded audio samples.

18. The computer storage media of claim 13, wherein the extracted audio data and the decoded video data are output to an audio minidriver and a video minidriver that represent virtualized audio and video devices on the server.

19. A client terminal comprising:
one or more processors; and
computer storage media storing computer executable instructions which when executed by the one or more processors implement a VDI client that is configured to virtualize audio and video devices on a server by performing the following:
receiving video data and audio data, wherein the video data comprises a sequence of images and the audio data comprises audible content;
encoding the video data to create an encoded video stream, the encoding including creating an access unit for each image of the sequence of images, each access unit comprising a number of network abstraction layer (NAL) units;
embedding the audio data within the encoded video stream, the embedding including, for each of at least some of the images in the sequence of images, adding a portion of the audio data that comprises audible content that corresponds with the particular image to one or more Supplemental Enhancement Information (SEI) NAL units of the access unit that was created for the particular image; and
transferring the encoded video stream with the embedded audio data to a server.

20. The client terminal of claim 19, wherein the VDI client is configured to encode the audio data and then embed the encoded audio data within the encoded video stream.

* * * * *